J. K. BROWN.
DEVICE FOR CUTTING UP CARCASSES.
APPLICATION FILED JAN. 3, 1917.
1,265,603.
Patented May 7, 1918.
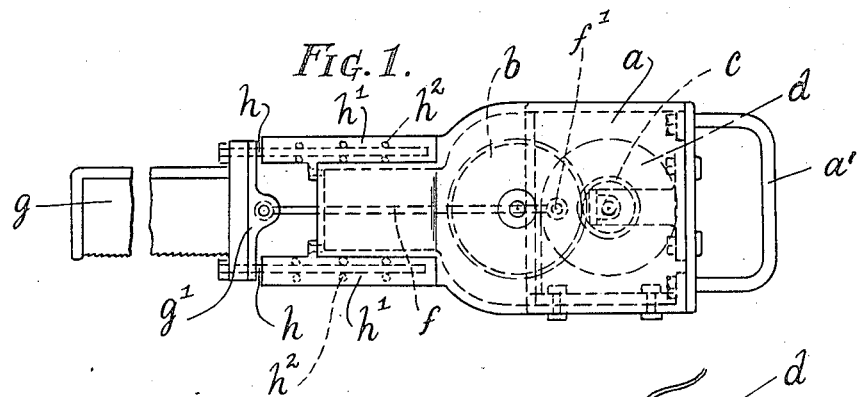
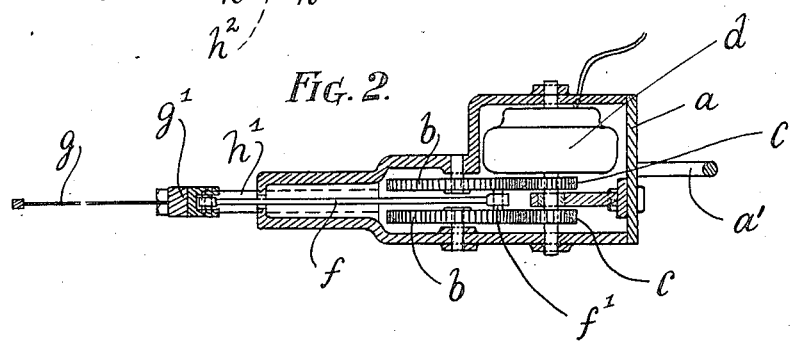
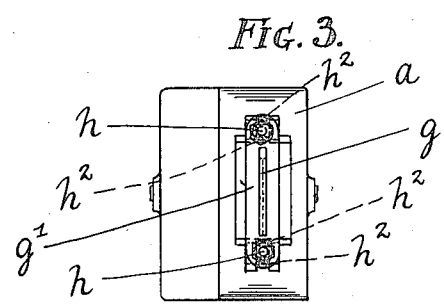
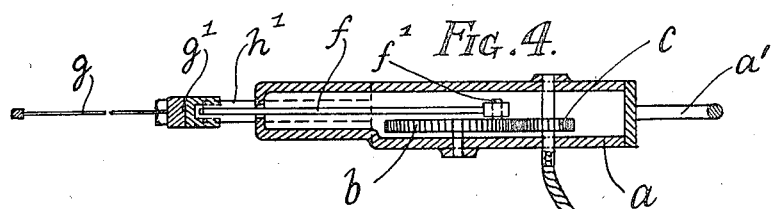
INVENTOR:
John Kirkwood Brown.
By
Wiedersheim & Fairbanks
ATTORNEYS.

UNITED STATES PATENT OFFICE.

JOHN KIRKWOOD BROWN, OF BELFAST, IRELAND.

DEVICE FOR CUTTING UP CARCASSES.

1,265,603.  Specification of Letters Patent.  Patented May 7, 1918.

Application filed January 3, 1917. Serial No. 140,375.

*To all whom it may concern:*

Be it known that I, JOHN KIRKWOOD BROWN, a subject of the King of Great Britain and Ireland, residing at Belfast, Ireland, have invented a certain new and useful Improved Device for Cutting Up Carcasses, of which the following is a specification.

This invention relates to an improved device for cutting up carcasses, in slaughter houses, or elsewhere, and the invention consists in a saw or cutting device, which may be similar to the usual hand saw, but is operated by power and is capable of being reciprocated so that the operator can speedily and without great physical exertion cut up the carcass in the desired manner.

The invention comprises a saw or cutting device having a handle provided with crank, or equivalent mechanism whereby the saw or cutting portion of the device can be reciprocated, the reciprocating mechanism being operated from a suitable source of power, preferably an electric motor integral with or forming part of the device.

Under one arrangement, the device consists of a handle provided with a series of toothed wheels which gear with each other one of the wheels constituting a crank to which one end of a connecting rod is connected, the other end of the rod being connected to the saw or cutting device which is slidably supported on rods or their equivalent, in guides, preferably roller bearing guides secured to or forming part of the handle.

In order that the invention may be clearly understood I have hereunto appended an explanatory sheet of drawings whereon my invention is shown.

Figure 1 is a side elevation of the power saw in accordance with my invention.

Fig. 2 is a sectional plan view, the section being taken substantially centrally lengthwise of Fig. 1.

Fig. 3 is an end view looking on the saw end of the device.

Fig. 4 is a sectional plan view of a similar device driven by a flexible shaft.

Referring to the drawings:—

The device shown on the drawings, consists of a casing $a$ having a handle $a^1$ and provided with toothed wheels $b$ which gear with wheels $c$ suitably driven by power through the medium of an electric motor $d$, the wheels $b$ having a pin $f^1$ to which one end of the connecting rod $f$ is connected, the other end of the rod $f$ being connected to a crosshead $g^1$ provided with a saw $g$ or equivalent cutting member, the crosshead being supported on rods $h$ or their equivalent, said rods being slidably supported in guides $h^1$ secured to the casing $a$, and having roller bearings $h^2$ on which the rods can roll as they are reciprocated.

As above stated the wheels $c$ are connected to the motor $d$ and the latter is connected with a suitable source of power, so that when the motor is operated the shaft $d$ will be rotated and will, through wheels $c$, rotate the wheels $b$, causing the rod $f$ to reciprocate the saw $g$. By means of the handle $a^1$ the device can be moved over the carcass, as desired by the operator.

In Fig. 4 a similar device is shown in which the drive to the wheels $c$ is effected through the medium of a flexible shaft $k$ driven by or from a suitable source of power.

Having now fully described my invention what I claim and desire to secure by Letters Patent is:—

1. A portable power-driven reciprocating saw or cutting device comprising a casing, a motor in the casing, gear wheels in the casing and connected to the motor and driven therefrom, a crank pin on one of the wheels, a rod attached at one end to the crank pin and at the other end to a reciprocating crosshead so as to reciprocate the latter, a saw connected to the crosshead so as to reciprocate therewith, rods supporting said crosshead, and roller bearings on which said rods move during their reciprocation.

2. A portable power-driven reciprocating saw or cutting device comprising a casing, a motor in said casing, gear wheels in said casing on the motor shaft, gear wheels within said casing meshing with the first-named wheels, a crank pin disposed between and connected to both of said last-named wheels, a rod disposed between said wheels and having one end connected to said crank pin, a crosshead to which the other end of said rod is connected, guides formed in an extension of said casing, roller bearings in said guides, and rods at opposite sides of said crosshead movable in said guides and upon said roller bearings.

In testimony whereof I affix my signature in presence of two witnesses.

JOHN KIRKWOOD BROWN.

Witnesses:
ANDREW HAMILTON,
JOHN KNOX.